United States Patent [19]

Grinberg et al.

[11] Patent Number: 5,479,908
[45] Date of Patent: Jan. 2, 1996

[54] ENGINE SPEED CONTROL DEVICE

[75] Inventors: Eugene Y. Grinberg, Shippensburg; Rodney Cisney, Orrstown, both of Pa.

[73] Assignee: Ingersoll-Rand Company, Woodcliff Lake, N.J.

[21] Appl. No.: 249,415

[22] Filed: May 26, 1994

[51] Int. Cl.[6] .............................. F02D 7/00; F02D 31/00
[52] U.S. Cl. ............................................ 123/386; 123/357
[58] Field of Search ................................... 123/357, 399, 123/339, 400, 402, 385, 386, 387

[56] References Cited

U.S. PATENT DOCUMENTS

| | | | |
|---|---|---|---|
| 3,148,790 | 9/1964 | Ziskal | 123/386 |
| 3,934,742 | 1/1976 | Tennis | 214/762 |
| 4,373,850 | 2/1983 | Dorham | 123/386 |
| 4,606,313 | 8/1986 | Izumi | 123/386 |
| 4,638,779 | 1/1987 | Kitada | 123/386 |
| 4,640,245 | 2/1987 | Matsuda et al. . | |
| 4,643,146 | 2/1987 | Spriessler | 123/385 |
| 4,773,369 | 9/1988 | Kobayashi | 123/385 |
| 4,773,370 | 9/1988 | Koshizawa et al. . | |
| 4,838,755 | 6/1989 | Johnson | 123/385 |
| 4,856,476 | 8/1989 | Shirakawa . | |
| 4,856,477 | 8/1989 | Hanaoka et al. . | |
| 4,864,994 | 9/1989 | Myers | 123/386 |
| 4,896,640 | 1/1990 | Pfalzgraf et al. . | |
| 4,953,529 | 9/1990 | Pfalzgraf et al. . | |
| 4,989,567 | 2/1991 | Fujioda | 123/385 |
| 4,993,384 | 2/1991 | Wiggins et al. . | |
| 5,025,770 | 6/1991 | Richardson | 123/357 |
| 5,040,508 | 8/1991 | Watanabe . | |
| 5,074,266 | 12/1991 | Kuhn et al. . | |
| 5,131,364 | 7/1992 | Mann . | |
| 5,148,790 | 9/1992 | Hickmann et al. . | |
| 5,150,681 | 9/1992 | Kull et al. . | |

*Primary Examiner*—Carl S. Miller
*Attorney, Agent, or Firm*—John J. Selko

[57] ABSTRACT

An electrical control system for a paving machine uses a linear actuator to control the speed of an internal combustion engine between a low idle condition, a full speed condition and an economy speed condition. The control system includes electrical circuits responsive to the activated or deactivated condition of propulsion system on the machine, the activated or deactivated condition of work implement systems on the machine and an operator selected activation switch on the machine.

4 Claims, 2 Drawing Sheets

ENGINE SPEED CONTROL DEVICE

BACKGROUND OF THE INVENTION

This invention relates generally to a device and method for controlling an internal combustion engine mounted on a construction vehicle, and more particularly, to a device that adjusts the engine speed between full speed, low idle speed and economy speed by simple electrical circuit connections.

Prior art engine speed control devices require either complicated load sensing devices or hydraulic actuated devices to change engine speeds. These devices are complicated to install and can present reliability concerns.

The foregoing illustrates limitations known to exist in present control devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a construction vehicle having an internal combustion engine and work implements mounted thereon, the engine driving a hydraulic system that provides a vehicle propulsion system and a work implement control system, an engine speed control system for controlling the engine's revolutions between a low idle condition, a full speed condition and an economy speed condition comprising: first electrical circuit means, including a propel lever, for an operator to selectively set the propel lever to signal the propulsion system to move the vehicle between a forward moving direction, a reverse direction and a neutral, non-moving position; second electrical circuit means, including a start/stop switch, the second electrical circuit means interconnected with the first electrical circuit means, for an operator to selectively set the start/stop switch to activate and deactivate the implement control system; third electrical circuit means, including a throttle switch, the third electrical circuit means interconnected with the first and second electrical circuit means, for an operator to set the throttle switch in a low idle speed position, a full speed position and an automatic speed adjustment position; and actuator means responsive to the throttle switch for moving a fuel feeding device on the vehicle between a low idle condition, a full speed condition and an economy speed condition.

The foregoing and other aspects will become apparent from the following detailed description of the invention when considered in conjunction with the accompanying drawing figures.

BRIEF DESCRIPTION OF THE DRAWING FIGURES

FIG. 1 is an exploded view schematic diagram, with parts removed, showing an actuator device of the invention connected to a throttle lever of an engine on a construction vehicle; and FIG. 2 is an exemplary schematic electrical circuit diagram showing the interconnected electrical circuits and components of the invention.

DETAILED DESCRIPTION

Figure 1:
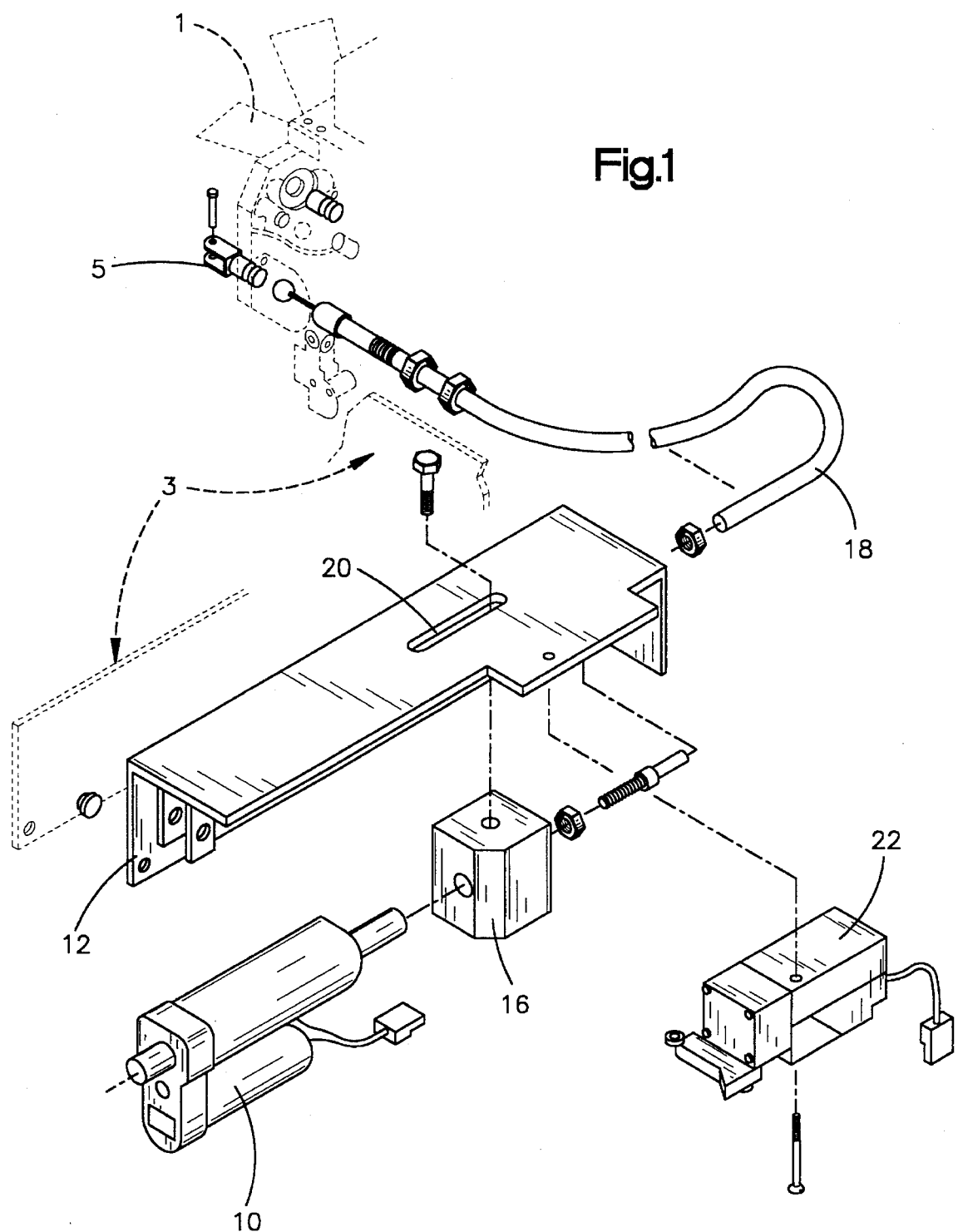

FIG. 1 shows in phantom an internal combustion engine 1 mounted on a construction vehicle 3, such as a paving machine. The engine speed in revolutions per minute is adjusted by moving the engine throttle 5 to change the rate of fuel feeding to the engine 1. As is well known, the engine 1 drives the propulsion and steering system 2 (shown in phantom in FIG. 2), which system comprises variable hydraulic pumps that propel the vehicle forward and back and provide steering for the vehicle. The hydraulic pumps also actuate the paver's work implement function systems 4 (shown in phantom in FIG. 2). The work implements include an auger, an auger conveyor, a screed vibrator, screed burners, screed extension and lifting devices, as well as hopper control devices and truck hitches and other optional work implements.

The actual moving of the throttle 5 is done by a linear actuator 10 mounted on the vehicle by means of a bracket 12, connected to the vehicle 3. Linear actuator 10 provides linear movement in response to electrical signals, as described hereinafter. Actuator 10 is connected, within a plastic block 16, to flexible cable 18. Block 16 is mounted on bracket 12 so that its position can be slidably adjusted along slot 20. An external limit switch 22 is mounted on bracket 12 in a position to be tripped when the actuator 10 is moved to an extreme position that is called for when the operator sets the electrical circuits to operate in the automatic control mode, as described hereinafter. Movement of actuator 10 back and forth speeds or slows the engine 1 accordingly. We prefer a linear actuator supplied by Warner Electric, South Beloit, Ill., 61080, under the trademark Electrak 1, model number S12-09A4-02.

Figure 2:
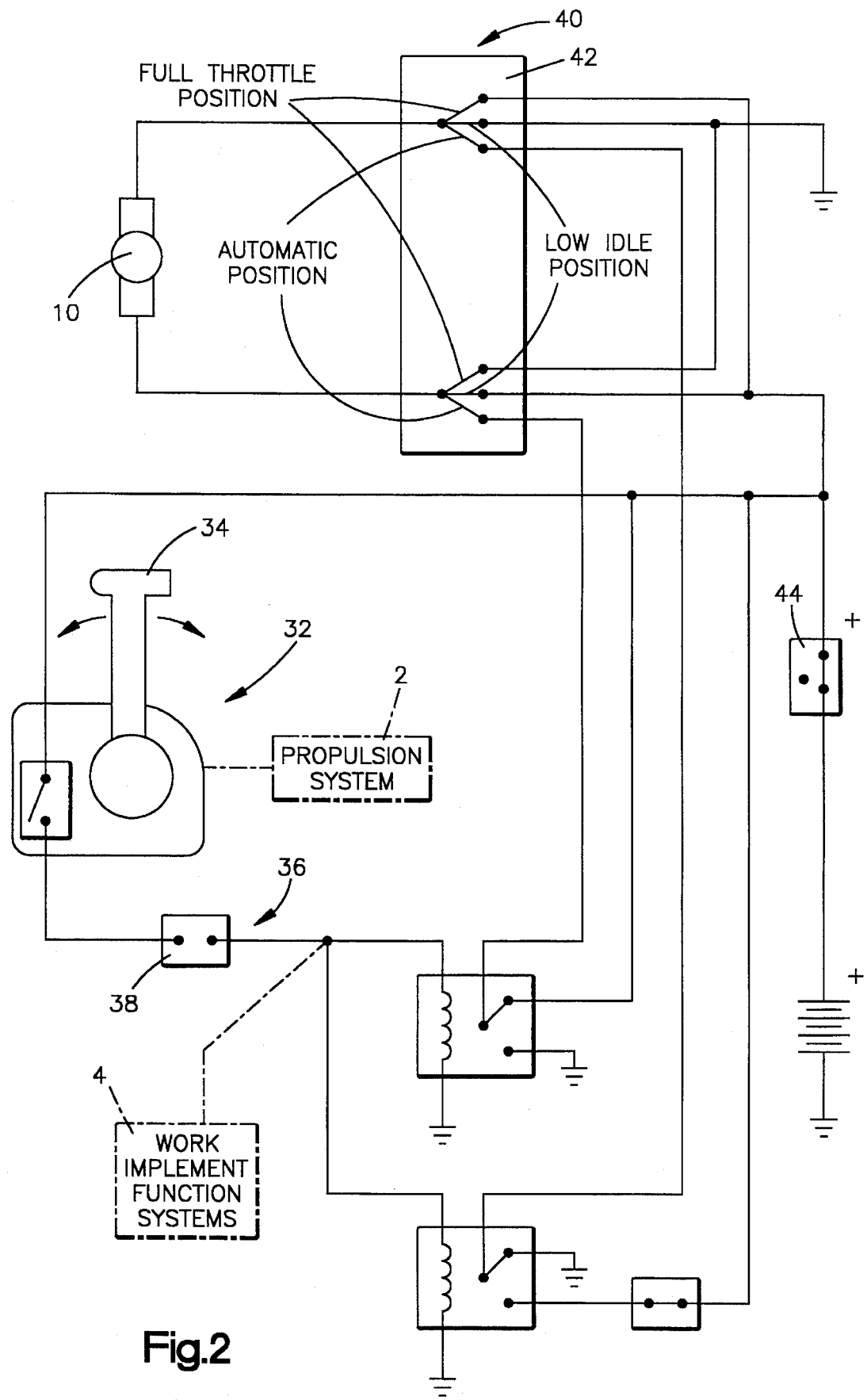

FIG. 2 shows an exemplary electrical schematic circuit of the invention for providing the automatic engine speed control of the invention. The first portion 32 of the electrical circuit includes a propel lever 34 for an operator to selectively signal the propulsion system 2 to move the vehicle between a forward moving direction, a reverse direction and a neutral, non-moving position. The propulsion system 2 does not form part of the invention, so long as it can be electrically connected to the circuit portion 32 by any well known means. We prefer relays that connect to a hydraulic propel motor by conventional means.

A second portion 36 of the electrical circuit includes a start/stop switch 38 for an operator to selectively activate and deactivate the implement function systems 4 all at the same time. Second electrical circuit portion 36 is interconnected with first electrical circuit portion 32, preferably as shown in FIG. 2. The implement function systems 4 do not form part of the invention, so long as they electrically connect the various implements to the second portion 36 by any well know means. We prefer electrical relays and switches that connect to hydraulic valves operable on each individual work implement.

Third portion 40 of the electrical circuit includes a three-position throttle switch 42 for the engine 1, so that an operator can selectively set the engine speed in a low idle speed position, a full speed position, or and automatic speed adjustment position. The actual speeds of the engine at each setting will depend on the engine characteristics, and can be selected by adjustment of actuator 10. Third electrical circuit portion 40 is interconnected with first electrical circuit portion 32, and second electrical circuit portion 36, preferably as shown in FIG. 2. Ignition switch 44 starts engine 1.

Lastly, actuator 10 is responsive to the settings of throttle switch 42 for moving throttle 5 between a low idle condition, a full speed condition and an economy speed condition.

In operation, the invention provides the various combinations of engine speeds and operating conditions shown in TABLE I.

TABLE I

| Engine Speed | Throttle Switch | Start/Stop Switch | Propel Lever |
|---|---|---|---|
| low idle | automatic | off | neutral |
| low idle | automatic | off | stroked forward |
| low idle | automatic | on | neutral |
| economy | automatic | on | stroked forward |
| full | full | on or off | any position |
| low idle | low idle | on or off | any position |
| low idle | automatic | on or off | stroked reverse |

TABLE I shows that the actuator 10 moves engine 1 into a low idle condition upon the occurrence of any of the following conditions:

a. throttle switch 42 is in low idle speed position, regardless of start/stop switch 38 position and regardless of propel lever 34 position;

b. throttle switch 42 is in automatic speed adjusting position, regardless of start/stop switch 38 position, and with propel lever 34 stroked in reverse;

c. throttle switch 42 is in automatic speed adjusting position, with start/stop switch 38 on, and propel lever 34 in neutral;

d. throttle switch 42 is in automatic speed adjusting position, with start/stop switch 38 off, and propel lever 34 stroked forward; and e. throttle switch 42 is in automatic speed position, with start/stop switch 38 off, and propel lever 34 neutral.

Table I also shows that the actuator 10 means moves engine 1 into a full speed condition when throttle switch 42 is in full speed position, regardless of start/stop switch 38 position, and regardless of propel lever 34 position.

Table I also shows that actuator 10 moves engine 1 into an economy speed condition when throttle switch 42 is in automatic speed control position, with start/stop switch 38 on, and propel lever 34 stroked forward.

These combinations of engine speeds and settings provide the most efficient operation of engine 1 under the various operating conditions encountered.

Having described the invention, what is claimed is:

1. In a construction vehicle having an internal combustion engine and work implements mounted thereon, the engine driving a hydraulic system that provides a vehicle propulsion system and a work implement control system, an engine speed control system for controlling the engine's revolutions between a low idle condition, a full speed condition and an economy speed condition comprising:

a. first electrical circuit means, including a propel lever, for an operator to selectively set said propel lever to signal the propulsion system to move the vehicle between a forward moving direction, a reverse direction and a neutral, non-moving position;

b. second electrical circuit means, including a start/stop switch, said second electrical circuit means interconnected with said first electrical circuit means, for an operator to selectively set said start/stop switch to activate and deactivate the implement control system;

c. third electrical circuit means, including a throttle switch, said third electrical circuit means interconnected with said first and second electrical circuit means, for an operator to set said throttle switch in a low idle speed position, a full speed position and an automatic speed adjustment position;

d. actuator means responsive to said throttle switch for moving a fuel feeding device on the vehicle between a low idle condition, a full speed condition and an economy speed condition; and e. wherein said actuator means moves said engine into a low idle condition upon the occurrence of any of the following conditions:

a. said throttle switch is in said low idle speed position, regardless of said start/stop switch position and regardless of said propel lever position;

b. said throttle switch is in said automatic speed adjusting position, regardless of said start/stop switch position, and with said propel lever stroked in reverse;

c. said throttle switch is in said automatic speed adjusting position, with said start/stop switch on, and said propel lever in neutral;

d. said throttle switch is in said automatic speed adjusting position, with said start/stop switch off, and said propel lever stroked forward; and e. said throttle switch is in said automatic speed position, with said start/stop switch off, and said propel lever neutral.

2. The engine speed control system of claim 1 wherein said actuator means moves said engine into a full speed condition when said throttle switch is in said full speed position, regardless of said start/stop switch position, and regardless of said propel lever position.

3. The engine speed control system of claim 2 wherein said actuator means moves said engine into an economy speed condition when said throttle switch is in said automatic speed control position, with said start/stop switch on, and said propel lever stroked forward.

4. The engine speed control system of claim 3 wherein said actuator means is a linear motor actuator.

* * * * *